(12) United States Patent
Corder et al.

(10) Patent No.: US 6,419,308 B1
(45) Date of Patent: Jul. 16, 2002

(54) MOVABLE ROOF SYSTEM FOR AN AUTOMOTIVE VEHICLE

(75) Inventors: George A. Corder, Romulus; Bernard W. Schaller, Flat Rock; Alvin D. Warden, Jr., Garden City; James E. Tousignant, New Boston, all of MI (US)

(73) Assignee: ASC Incorporated, Southgate, MI (US)

(*) Notice: Subject to any disclaimer, the term of this patent is extended or adjusted under 35 U.S.C. 154(b) by 0 days.

(21) Appl. No.: 09/694,379

(22) Filed: Oct. 23, 2000

Related U.S. Application Data

(60) Provisional application No. 60/162,339, filed on Oct. 29, 1999.

(51) Int. Cl.[7] ............................................. B60J 7/043
(52) U.S. Cl. .......................... 296/216.02; 296/216.04; 296/136; 296/107.08; 296/147; 296/37.1
(58) Field of Search ...................... 296/216.02–216.04, 296/222, 107.18–107.2, 136, 216.06–216.08, 37.1, 147, 107.08, 219, 220.01, 146.14, 37.16

(56) References Cited

U.S. PATENT DOCUMENTS

| | | | |
|---|---|---|---|
| 1,622,899 A | * | 3/1927 | Barnes .................. 296/107.08 |
| 2,013,314 A | * | 9/1935 | Metz ..................... 296/107.02 |
| 2,215,363 A | | 9/1940 | Ruppel et al. |
| 2,436,728 A | | 2/1948 | Parsons |
| 2,596,355 A | | 5/1952 | Ackermans |
| 2,704,225 A | | 3/1955 | Anschuetz et al. |
| 2,714,035 A | | 7/1955 | Limberg et al. |
| 2,747,921 A | | 5/1956 | Hooverson et al. |
| 2,747,923 A | | 5/1956 | McLean |
| 2,762,648 A | | 9/1956 | Huzzard |
| 2,782,070 A | | 2/1957 | Chaban |
| 2,785,922 A | | 3/1957 | Chika |
| 2,836,457 A | | 5/1958 | Berman |
| 2,957,725 A | | 10/1960 | Ford, II et al. |
| 3,332,169 A | | 7/1967 | Lohr et al. |
| 3,333,362 A | | 8/1967 | Kostin et al. |
| 3,347,592 A | | 10/1967 | Renneker |
| 3,357,738 A | | 12/1967 | Bourlier |
| 3,823,977 A | | 7/1974 | Fioravanti |
| 4,543,747 A | | 10/1985 | Kaltz et al. |
| 4,854,634 A | | 8/1989 | Shiraishi et al. |
| 5,018,783 A | | 5/1991 | Chamings et al. |
| 5,029,937 A | | 7/1991 | Yamamoto |
| 5,078,447 A | | 1/1992 | Klein et al. |
| 5,090,764 A | | 2/1992 | Kogawa et al. |
| 5,103,382 A | | 4/1992 | Kondo et al. |
| 5,119,068 A | | 6/1992 | Nagai et al. |
| 5,165,772 A | | 11/1992 | Wu |
| 5,197,779 A | | 3/1993 | Mizuno et al. |
| 5,209,544 A | * | 5/1993 | Benedetto et al. ....... 296/136 X |
| 5,746,475 A | | 5/1998 | Caye et al. |
| 5,944,378 A | | 8/1999 | Mather et al. |
| 5,951,100 A | | 9/1999 | Ewing et al. |
| 5,961,177 A | | 10/1999 | Caye et al. |
| 5,975,620 A | | 11/1999 | Jambor et al. |
| 5,975,820 A | | 11/1999 | Kirchen |
| 6,217,102 B1 | * | 4/2001 | Lathers ................. 296/100.1 X |

FOREIGN PATENT DOCUMENTS

| | | | | |
|---|---|---|---|---|
| DE | 3816060 A1 | | 11/1989 | |
| EP | 101322 | * | 2/1984 | .................. 296/222 |
| EP | 0 999 079 A2 | | 10/1999 | |
| GB | 530784 | * | 12/1940 | ............ 296/220.01 |
| JP | 356149213 | * | 11/1981 | ............ 296/216.04 |
| JP | 5-24437 | | 2/1993 | |

OTHER PUBLICATIONS

Translation of selected portions of EP 0 999 079 A2.

* cited by examiner

*Primary Examiner*—Dennis H. Pedder
(74) *Attorney, Agent, or Firm*—Harness, Dickey & Pierce, P.L.C.

(57) ABSTRACT

A movable roof system for an automotive vehicle includes a roof panel which can be retracted to a stowed position below a storage compartment cover while the vehicle is being driven. In another aspect of the present invention, two or more generally rigid roof panels are movable from above a passenger compartment to below a plane defined by a closed rear deck lid.

39 Claims, 10 Drawing Sheets

MOVABLE ROOF SYSTEM FOR AN AUTOMOTIVE VEHICLE

This application claims priority from provisional application No. 60/162,339, filed Oct. 29, 1999.

BACKGROUND AND SUMMARY OF THE INVENTION

The present invention relates generally to automotive vehicles and more specifically to a movable roof system for an automotive vehicle.

It is common in the automotive industry to employ fabric covered convertible roofs and hard-top convertible roofs which are movable from a closed position above a passenger compartment to a retracted position within a bootwell or trunk. It is also known to provide movable tonneau covers to cover the stowed convertible roofs. For example, reference should be made to U.S. Pat. No. 5,090,764 entitled "Vehicle Body Construction for Hardtop Convertible" which issued to Kogawa et al. on Feb. 25, 1992, and German 38 16 060 entitled "Passenger Car having a Two-Part Hardtop" which was published on Nov. 16, 1989. However, most automotive vehicles must be parked and prevented from driving when the convertible roof is moved between the closed and stowed position. Otherwise, the wind created during driving would catch the inside of the convertible roof and tonneau cover when they are pivoted to near-vertical positions thereby potentially damaging the mechanisms. Therefore, many recent vehicles have either employed electric circuits that require the parking brake to be applied or the automatic transmission must be shifted to the park position, before the convertible roof actuators are energized.

It has also become desirable to maximize the open air or open roof space above the passenger compartment. The following U.S. patents disclose various conventional sunroof constructions: U.S. Pat. No. 5,961,177 entitled "Sunroof Assembly Drain Trough for an Automotive Vehicle" which issued to Caye et al. on Oct. 5, 1999; U.S. Pat. No. 5,951,100 entitled "Sunroof Assembly for an Automotive Vehicle" which issued to Ewing et al. on Sep. 14, 1999; U.S. Pat. No. 5,197,779 entitled "Power Sliding Sunroof" which issued to Mizuno et al. on Mar. 30, 1993; U.S. Pat. No. 5,029,937 entitled "Roof System for Vehicle" which issued to Yamamoto on Jul. 9, 1991; and U.S. Pat. No. 5,018,783 entitled "Slidable, Foldable, and Removable Vehicle Sunroof" which issued to Chamings et al. on May 28, 1991. All of these patents are incorporated by reference herein. While many of these prior arrangements have significantly improved the art, however, the open air space can still be further increased while increasing passenger compartment headroom.

Another traditional automotive vehicle has employed a flexible fabric roof which can be closed by manually snapping or otherwise attaching the fabric roof to stationary roof rails and a front header. This fabric roof can also be manually rolled up to fully expose the passenger compartment between the roof rails. Notwithstanding, this conventional approach is time-consuming to close, unsightly, and cannot be easily retracted during vehicle driving and lacks adequate cold weather insulating properties.

In accordance with the present invention, a movable roof system for an automotive vehicle includes a roof panel which can be retracted to a stowed position below a storage compartment cover while the vehicle is being driven. In another aspect of the present invention, two or more generally rigid roof panels are movable from above a passenger compartment to below a plane defined by a closed rear deck lid. A further aspect of the present invention provides a back window which can be raised and lowered without necessitating retraction of a movable roof panel. Still another aspect of the present invention employs a pair of stationary side rails, and one or more generally rigid roof panels, and a generally rigid back window which are all movable from passenger compartment covering positions to a stowed position beneath a tonneau cover. In a further aspect of the present invention, a light is mounted to a movable tonneau cover. Another aspect of the present invention provides a dividing member to selectively segregate a convertible roof storage compartment from a trunk compartment. A back window-to-storage compartment cover sealing arrangement is also provided.

The movable roof system of the present invention is advantageous over conventional devices in that the present invention allows for easy retraction and closure of a convertible roof with a rigid tonneau cover while the vehicle is being driven. The movable roof panels are not prone to significant wind drag by their sliding movements within tracks and due to the relatively low drag angulation of the movable panels, especially as compared to the traditional verticality of prior convertible roofs when closed and opened. The sequence of movement of the present invention tonneau cover also is also not prone to significant wind resistance or drag, thereby allowing opening while the vehicle is being driven. The use of stationary side rails for the present invention also enhances vehicle structural integrity when the roof panels are stowed while also serving as a sturdy platform to mount elongated tracks and the corresponding roof panel driving mechanisms. The roof system of the present invention also advantageously allows independent venting and partial retracted opening of the front roof panel regardless of whether the back window and/or the rear roof panel are closed or stowed. The back window can also be opened without requiring concurrent movement of the front or rear roof panels. Additional advantages and features of the present invention will become apparent from the following description and appended claims, taken in conjunction with the accompanying drawings.

DETAILED DESCRIPTION OF THE PREFERRED EMBODIMENT

Figure 1:
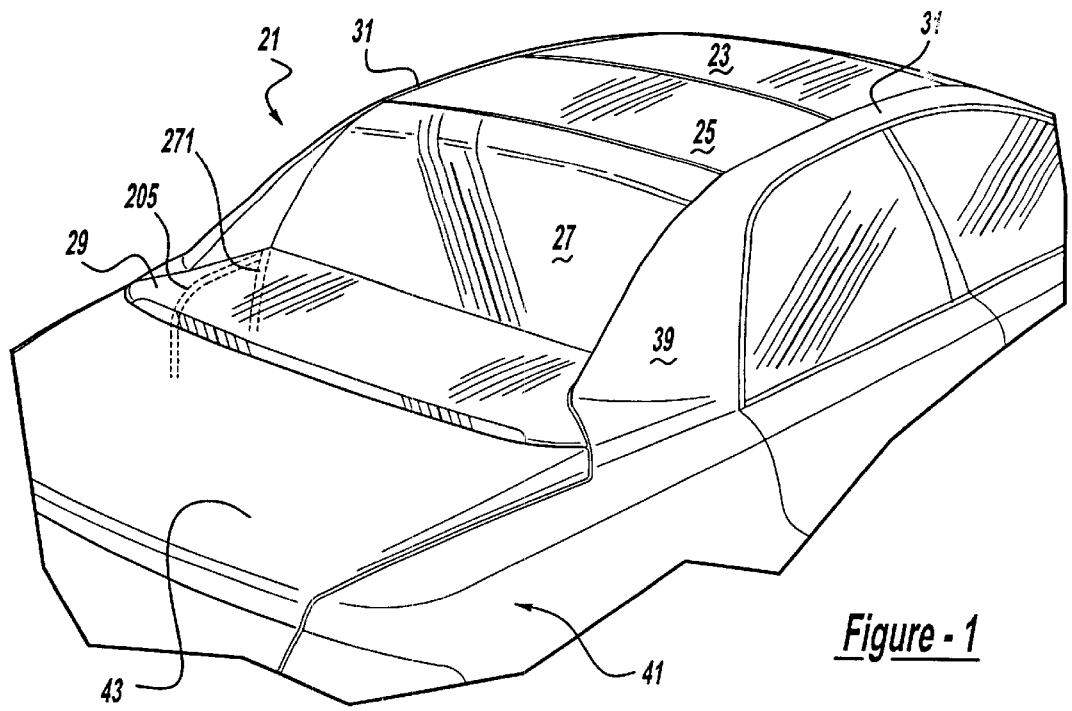
FIG. 1 is a fragmentary perspective view showing the preferred embodiment of the roof system of the present invention with a front roof panel, rear roof panel, back window and tonneau cover all located in their respective closed positions.
Figure 2:
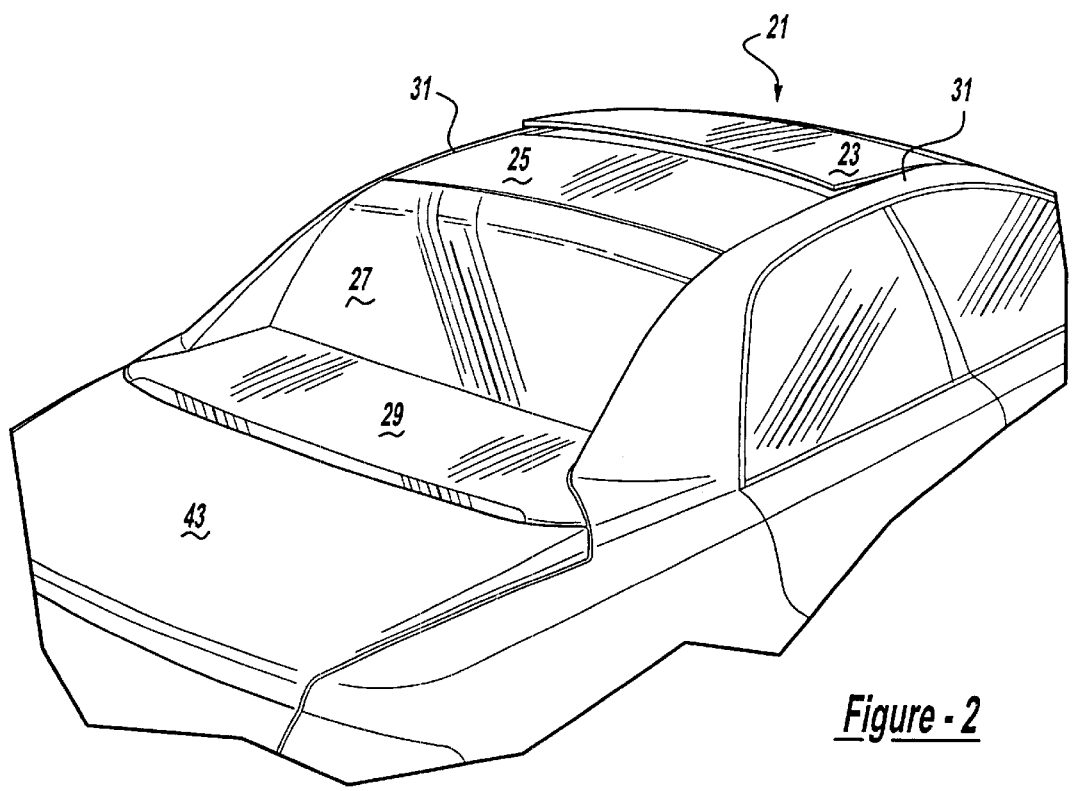
FIG. 2 is a fragmentary perspective view showing the preferred embodiment roof system like FIG. 1, but with the front roof panel tilted to a venting position.

Referring to FIGS. 1–6, the preferred embodiment of a roof system 21 of the present invention includes a front roof panel 23, a rear roof panel 25, a rear window or backlite 27, and a tonneau cover 29. Front roof panel 23, rear roof panel 25 and back window 27 all span in a crosscar direction between a pair of stationary roof rails 31 above a passenger compartment 33 (see FIG. 6). A front header panel 35 serves to structurally connect together side rails 31 adjacent to a front windshield 37. Roof rails 31 rearwardly transition into enlarged C-pillars 39 which are also known as quarter upper panels or sail panels. Tonneau cover 29 spans in a crosscar manner between C-pillars 39. A roof storage compartment 209 (see FIG. 18) is covered by tonneau cover 29 and a trunk compartment 41 is covered by a pivotable trunk or deck lid 43. Deck lid 43 is disposed behind and generally parallel with the horizontally closed tonneau cover 29.

Figures 11, 12:
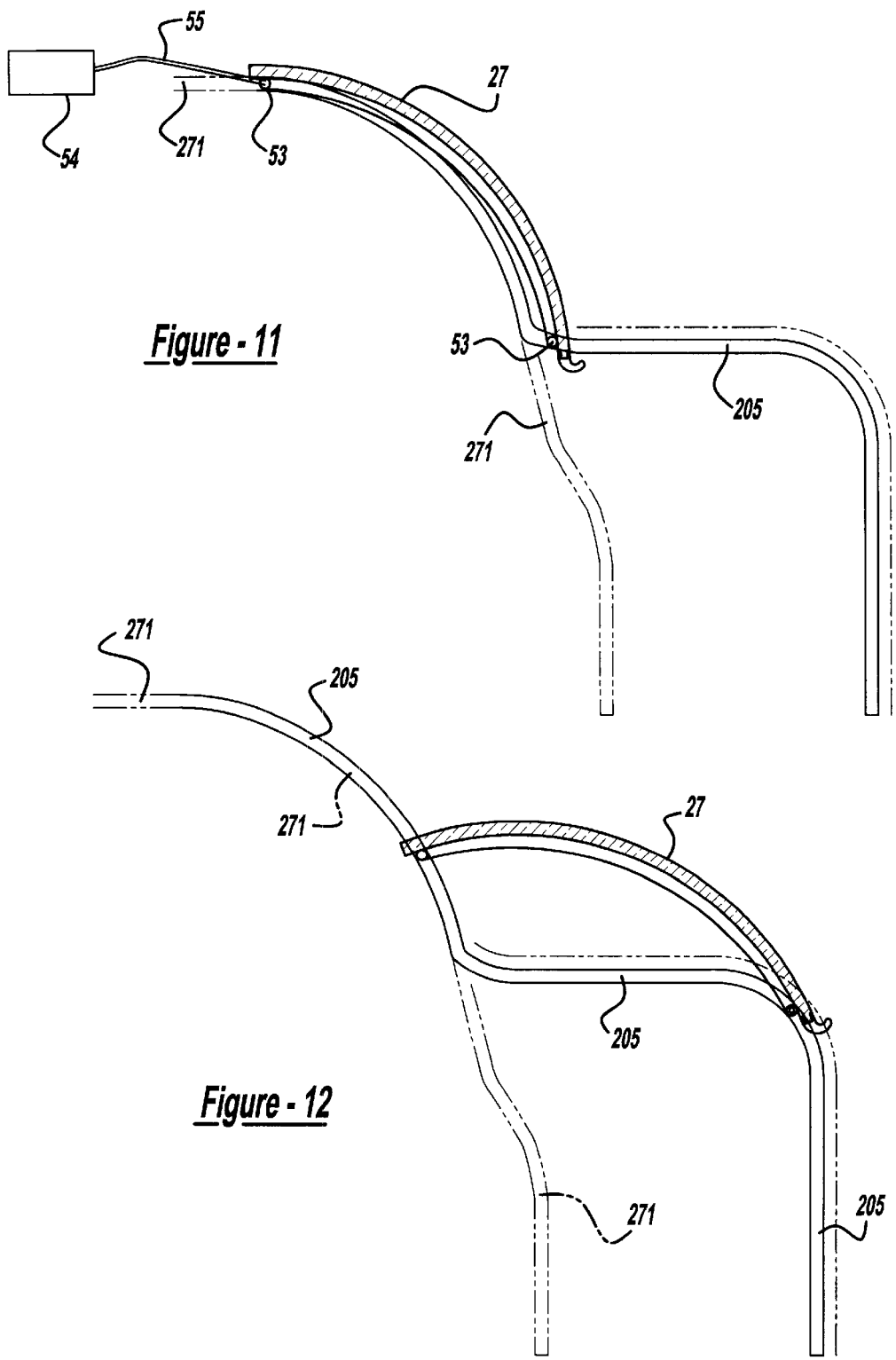
FIG. 11 is a diagrammatic side view showing the preferred embodiment roof system employing a back window drive mechanism, with the back window disposed in a raised and closed position.
FIG. 12 is a diagrammatic side view showing the preferred embodiment roof system employing the back window drive mechanism, with the back window disposed in a partially open position.
Figure 13:
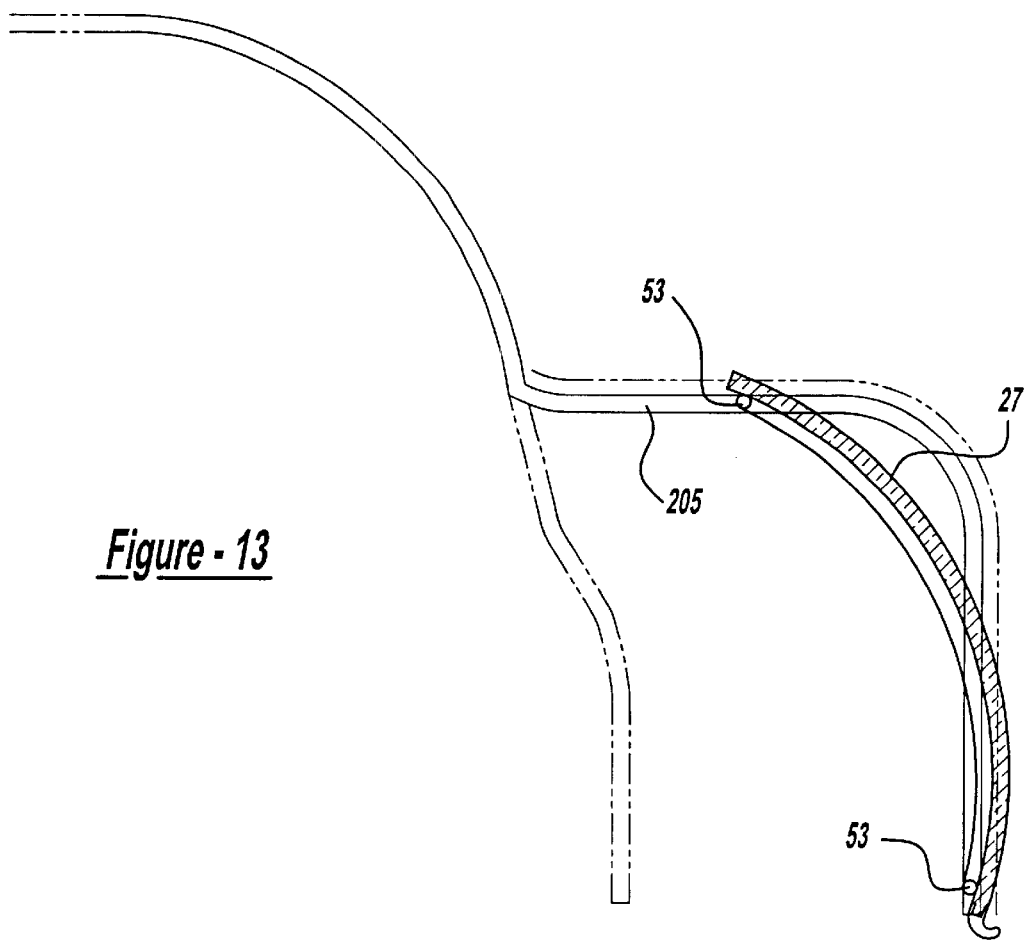
FIG. 13 is a diagrammatic side view showing the preferred embodiment roof system employing the back window drive mechanism, with the back window disposed in a fully lowered and open position.
Figure 16:
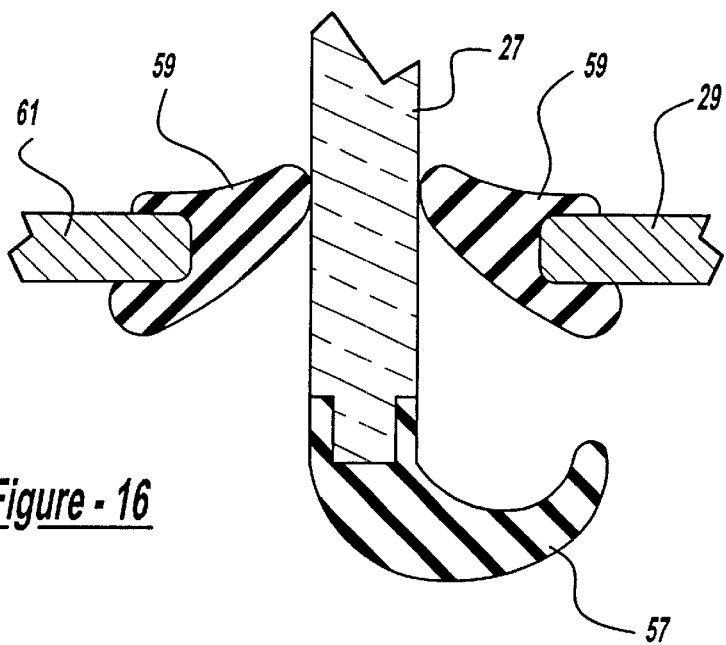
FIG. 16 is a diagrammatic cross sectional view along the vehicle centerline, showing the preferred embodiment roof system employing a sealing arrangement between a package shelf, the tonneau cover and the back window.
Figure 14:
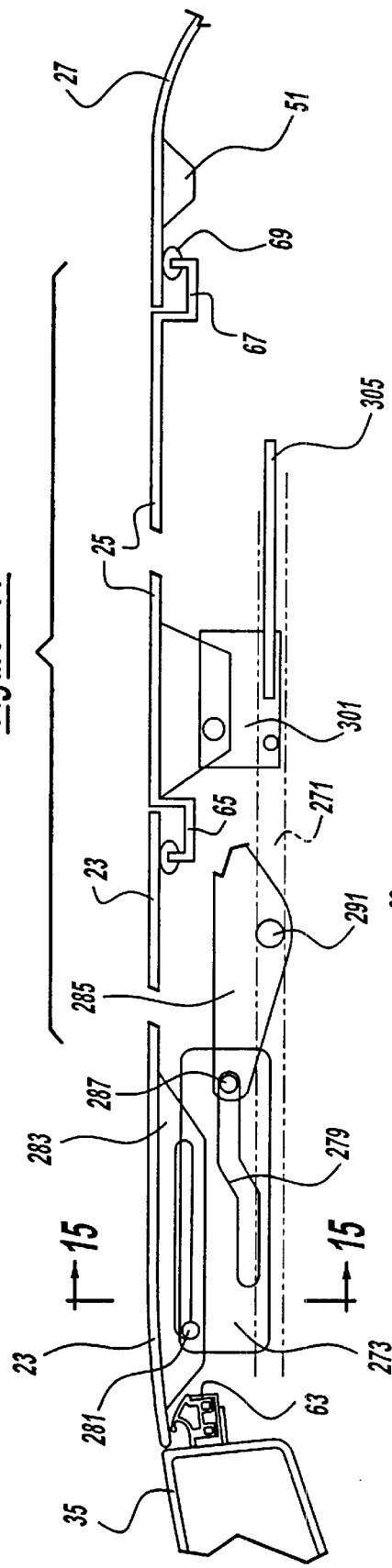
FIG. 14 is a diagrammatic side view showing the preferred embodiment roof system employing a front roof panel and rear roof panel drive mechanisms, with the front roof panel, rear roof panel and back window disposed in their respective closed positions.

Referring to FIGS. 11, 14 and 16, back window 27 is preferably formed in a three-dimensional manner from glass. Blackout ceramic frit is silk-screened onto an interior surface of back window 27 in addition to any desired defroster elements. A plastic or stamped metal support frame 51 is adhesively bonded to the interior surface of the ceramic frit without being visible from outside the vehicle. A bracket with rollers 53 is affixed adjacent each corner of frame 51. An electric motor 54 mounted to the front header pushes and pulls back window 27 by a sunroof-type cable 55 located inside a track. A flexible rubber or rigid stamped metal drain trough 57, having a U-cross sectional shape, extends from frame 51 adjacent a lower edge of back window 27. Alternately, drain trough 557 may be encapsulated onto the bottom edge of backlite 27 by insert molding the glass panel with a PVC or RIM material.

A front edge of tonneau cover 29 has a rubber seal 59 with an elongated flexible finger as does a rear edge of a package shelf 61. Seals 59 contact against their adjacent surfaces of back window 27 in a generally water tight manner when the back window is in its raised position and tonneau cover 29 is in its closed position. The bottom edge of back window 27 is located below a plane defined by tonneau cover 29 and package shelf 61 such that drain trough 57 collects any water leaking through seal or flowing off of the tonneau cover when it is opened. A flexible rubber drain hose (not shown) is connected to an opening in drain trough 57 to transmit any water therein outside of the vehicle.

As can be observed in FIG. 14, front roof panel 23 and rear roof panel 25 are preferably stamped from aluminum or steel sheet. An interior surface of front roof panel 23 compresses a weatherstrip 63 mounted to front header 35 and side rails 31, when front roof panel 23 is disposed in its closed position. Thus, water will flow from the exterior surface of front roof panel 23 to drainage areas outboard of weatherstrip 63. Rear roof panel 25 has a leading depressed drain trough 65 and a trailing depressed drain trough 67 which both extend in a crosscar manner. A weatherstrip 69 is mounted on peripheral flanges of these drain troughs for abutting against interior surfaces of the corresponding front roof panel 23 and back window 27. It is alternately envisioned that three or more rigid roof panels can be used in place of the two disclosed. Back window 27 may also have a metal frame which is visible from outside the vehicle.

Figure 7:
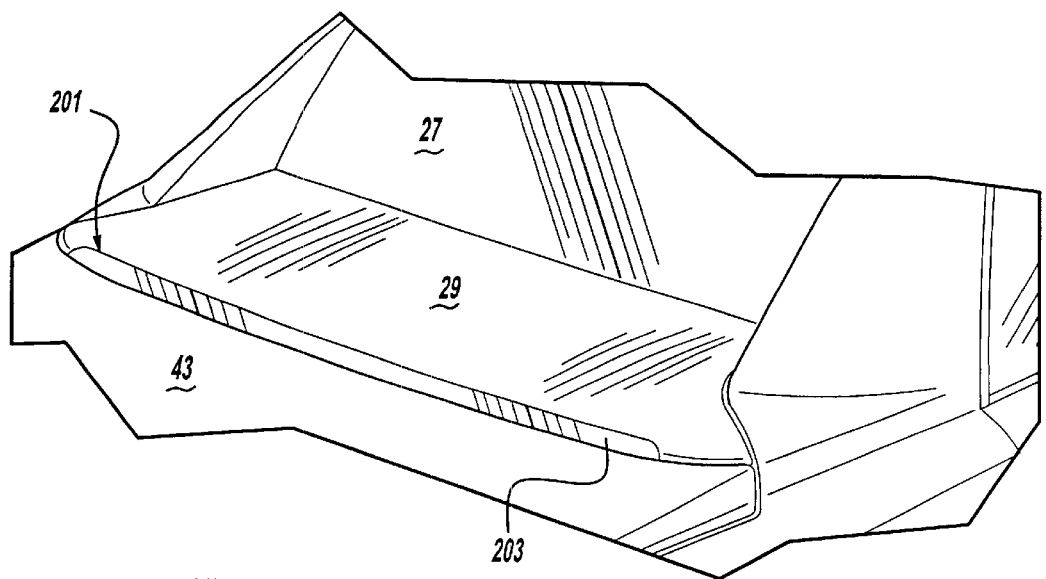
FIG. 7 is a fragmentary perspective view showing the preferred embodiment roof system employing a center high mount stop light on the tonneau cover.

Tonneau cover 29 is shown in greater detail in FIG. 7. A center high mount stop light 201 is mounted to rear edge of tonneau cover 29 such that a red lens 203 is visible from outside the vehicle. Stop light 201 and lens 203 have an elongated shape extending in a generally crosscar manner and a relatively short height dimension. Stop light 201 is mounted within a slot in the stamped aluminum or steel tonneau cover and utilizes the majority of space provided along the rear edge of tonneau cover 29. An upper external surface of tonneau cover 29 is generally flat and horizontal with only a slight three-dimensional curvature. Tonneau cover 29 is slightly offset above the plane of deck lid 43 such that the approximately one inch of height stop light 201 is visible from behind the vehicle when tonneau cover 29 and deck lid 43 are in their closed positions. Stop light 201 employs internal light sources such as incandescent bulbs or light emitting diodes which can be serviced from the bottom side of tonneau cover 29. Examples of the internal stop light componentry is described in the following U.S. Pat. No. 5,165,772 entitled "Visual Display Device" which issued to Wu on Nov. 24, 1992; U.S. Pat. No. 5,119,068 entitled "Rear Spoiler for Use in Automobile" which issued to Nagai et al. on Jun. 2, 1992; and U.S. Pat. No. 5,103,382 entitled "Auxiliary Stop Lamps" which issued to Kondo et al. on Apr. 7, 1992; these patents are incorporated by reference herein.

Figure 8:
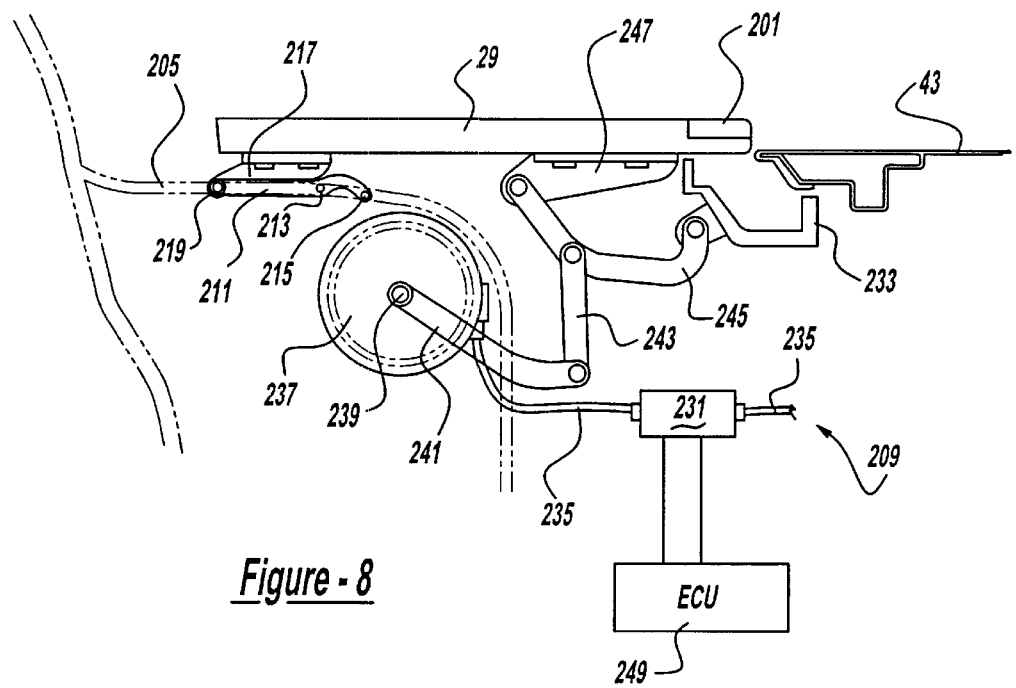
FIG. 8 is a diagrammatic side view showing the preferred embodiment roof system employing a tonneau cover drive mechanism, with the tonneau cover disposed in a closed position.
Figure 9:
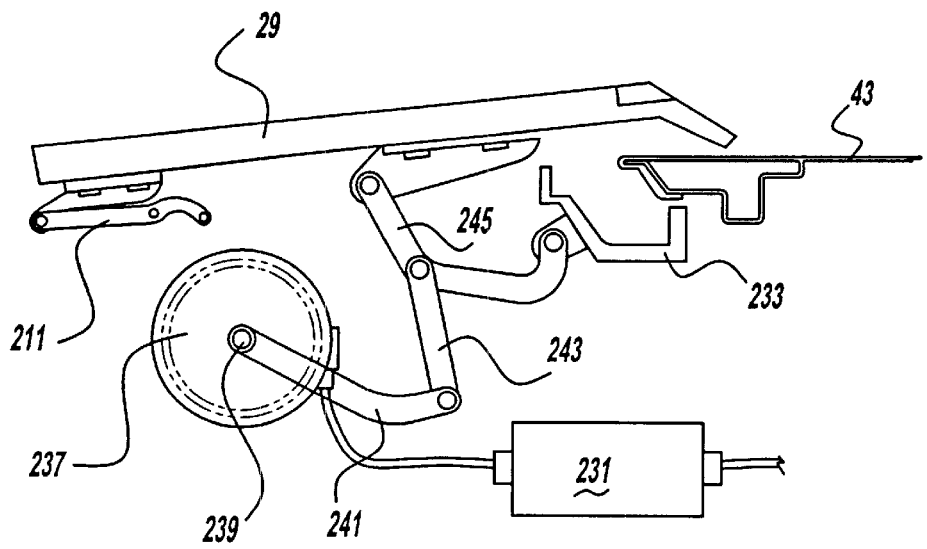
FIG. 9 is a diagrammatic side view showing the preferred embodiment roof system employing the tonneau cover drive mechanism, with the tonneau cover disposed in a partially open position.
Figure 10:
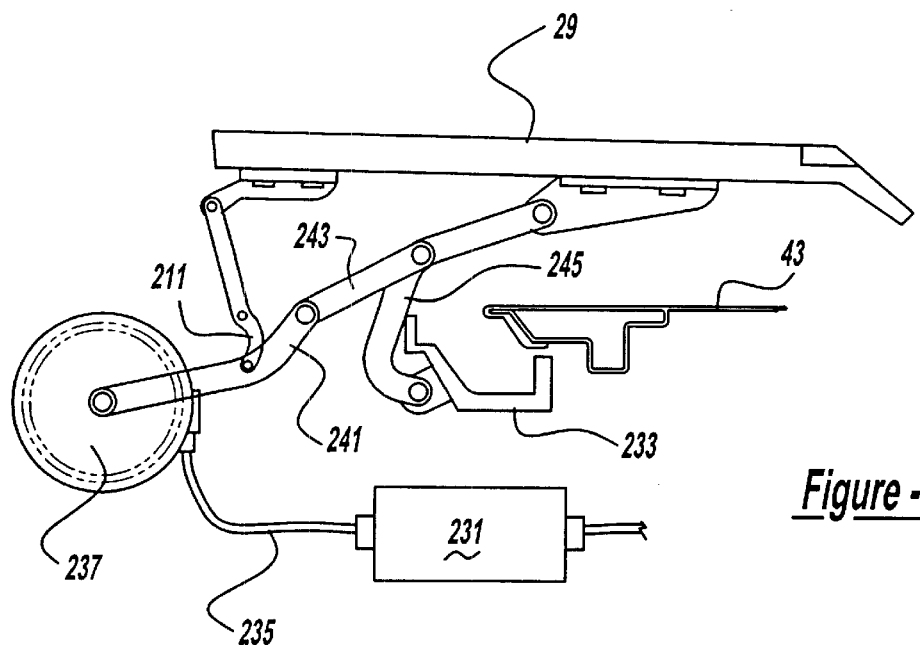
FIG. 10 is a diagrammatic side view showing the preferred embodiment roof system employing the tonneau cover drive mechanism, with the tonneau cover disposed in a fully opened position.

The drive mechanism for tonneau cover 29 is shown in FIGS. 8–10. A generally S-shaped track 205 is mounted to the inside of a quarter panel 207 (see FIG. 6) and within a roof storage compartment 209, also known as a bootwell. The tonneau drive mechanism, as well as most other drive mechanisms discussed herein, are disposed in a mirrored symmetrical fashion on both sides of the vehicle and will only be further described herein for one side. S-shaped track 205 has an upper channel and a lower channel. A guide link 211 has a pair of rollers 213 and 215 which slide within the upper channel of S-shaped track 205. Guide link 211 is coupled to a front bracket 217 by a pivot 219. Front bracket 217 is adhered, riveted or screwed onto an interior surface of tonneau cover 29. A fractional horsepower, direct current electric motor 231 is attached to a cross-car extending rear reinforcement 233 for rotating a speedometer-type flexible cable 235 out each end. Thus, motor 231 drives both sides. A pinion gear is attached to an opposite end of cable 235 for rotatably driving a gear box 237. One or more gears inside gear box 237 are rotated to drive a central hub 239 which, in turn, rotates a driving link 241. Driving link 241 serves to move an intermediate link 243 pivotably coupled thereto and also an elongated gooseneck link 245 pivotably coupled to intermediate link 243, rear reinforcement 233 (which is stationary) and a rear bracket 247 mounted to the interior surface of tonneau cover 29.

When an electronic control unit 249, such as a microprocessor, energizes electric motor 231, the linkage arrangement will initially lift the rear portion of tonneau cover 29 from the closed position of FIG. 8 to the partially open position of FIG. 9 while preventing either of the front and back edges of the tonneau cover from pivoting more than 45 degrees above a plane defined by the closed position of the tonneau cover. The geometry of guide link 211 relative to the horizontal and then rear generally vertical sections of track subsequently causes the leading edge of tonneau cover 29 to rise from the position shown in FIG. 9 to the slight nose up, open position of FIG. 10. The tonneau cover is in an overlapping and generally parallel orientation relative to deck lid 43 when open. The open position of tonneau cover 29 allows the back window and movable roof panels to be retracted from their closed positions covering the passenger compartment, to their stowed and open positions within roof storage space 209, which is below a generally horizontal deck lid plane 261. It is also noteworthy that rear reinforcement 233 includes a steel drain trough segment for water flowing off of the deck lid and rear portion of the tonneau cover. Tonneau cover 29 is moved from the open position to the closed position by a reversal of the previously discussed motions. Accordingly, the tonneau cover opening and closing movement enhances aerodynamic performance during operation and reduces wind drag which would otherwise occur in a conventional vertically pivoting rigid tonneau cover.

Figure 3:
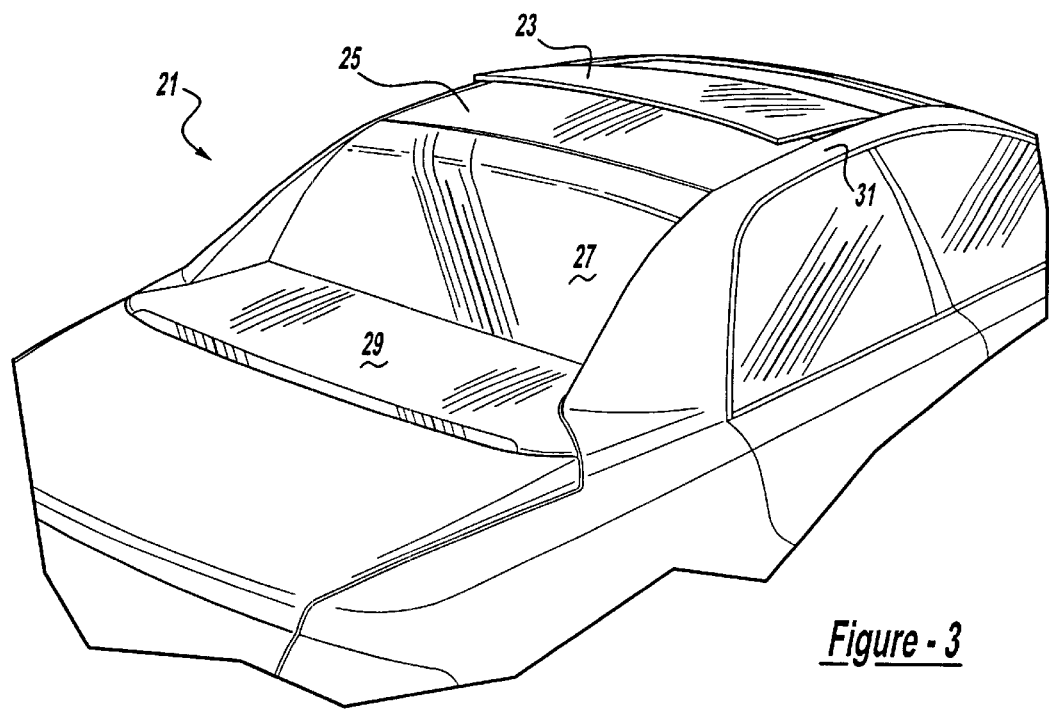
FIG. 3 is a fragmentary perspective view showing the preferred embodiment roof system like FIG. 2, but with the front roof panel disposed in a partially open spoiler position.
Figure 15:
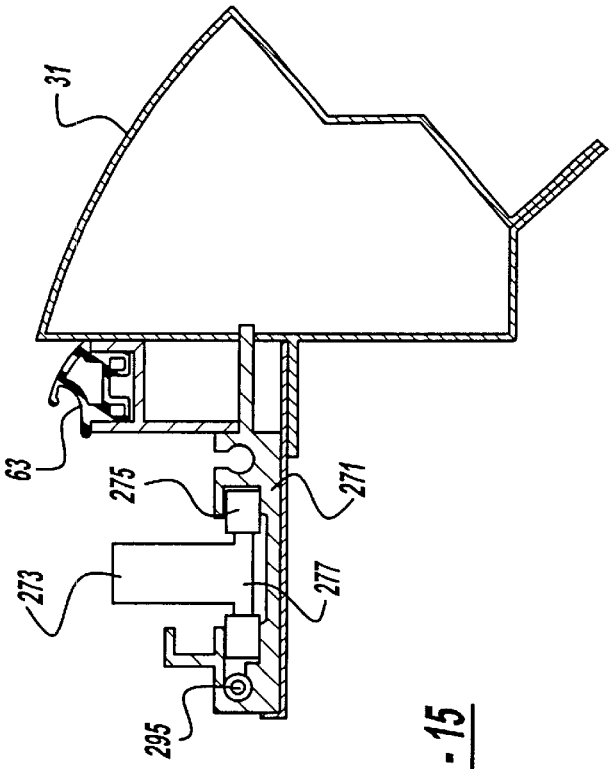
FIG. 15 is a cross sectional view, taken along line 15—15 of FIG. 14, showing the preferred embodiment roof system employing a track, the front roof panel drive mechanism and a side rail.
Figure 17:
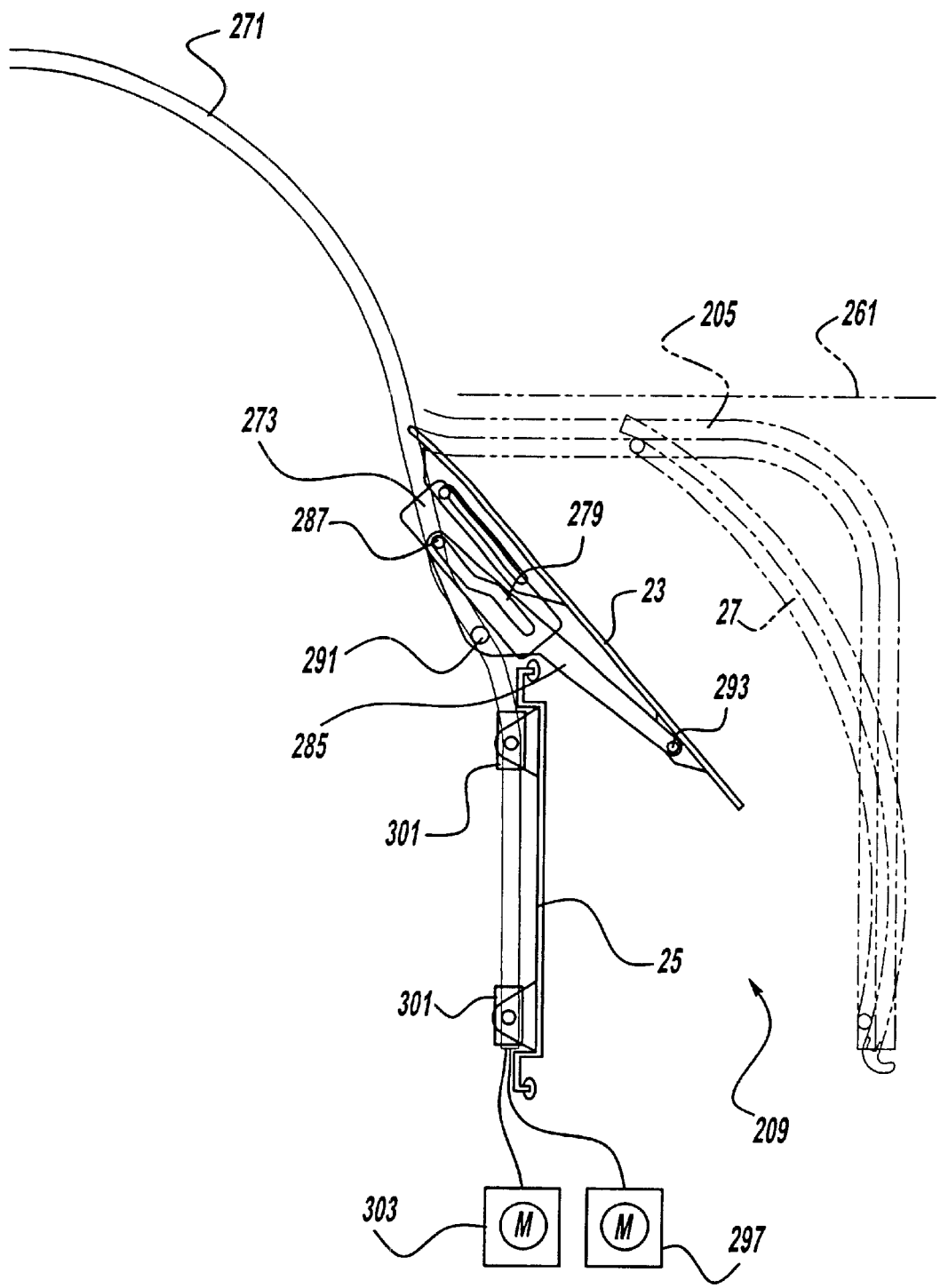
FIG. 17 is a diagrammatic side view showing the preferred embodiment roof system, with the front roof panel, rear roof panel and back window all in their respective open positions.

FIGS. 14, 15 and 17 show a stationary primary track 271 mounted to each side rail 31. Track 271 is preferably extruded from aluminum and is elongated in a generally fore-and-aft direction extending from front header 35 to the bottom of roof storage compartment 209. At the C-pillar area, the vertically rising portions of S-shaped track 205 and primary track 271 are adjacent each other in a crosscar and parallel direction. A cam block 273 has four feet 275 rotatably extending in a lateral crosscar direction from a main body 277. An S-shaped camming slot 279 is located in body 277 of camming slot 273. A front pivot 281 couples a bracket 283, adhesively bonded or otherwise fastened to an interior surface of front roof panel 23, to cam block 273. A triangular side view-shaped lever 285 has a camming pin 287 which rides in camming slot 279 of cam block 273. A fulcrum pivot 291 of lever 285 has laterally extending feet which ride within the channel of track 271. A rear pivot 293 couples a rear bracket, fastened to an interior surface of front roof panel 23, to lever 285. A sunroof-type flexible and elongated cable 295 is positioned within a slot of track 271 and has a leading end piece which is fastened to cam block 273. Accordingly, when a fractional horsepower, direct current, electromagnetic motor 297 pushes or pulls cable 295, cam block 273 will move relative to track 271 and front header panel 35. Electronic control unit 249 (see FIG. 8) will act in response to a vehicle operator switch and will thus energize electric motor 297 for either a predetermined time or until a hall-effect or similar encoder indicates the desired position of cam block 273. Cam block 273 is thereby rearwardly retracted in an initial lost motion manner. This causes camming pin 287 of fulcrum 285 to slide downwardly in camming slot 279 thereby upwardly rotating rear pivot 293 of lever 285 about fulcrum 291. The elongated slot in bracket 283 allows for a lost motion arrangement with pivot 281 such that the back end of front roof panel 23 is tilted from the closed position as shown in FIG. 1 to the venting position shown in FIG. 2. When the cable subsequently pulls cam block 273 further rearward, the entire tilted front sunroof panel 23 is retracted partially above the otherwise stationary rear roof panel 25 in an overlapping spoiler-type arrangement as shown in FIG. 3.

Figure 4:
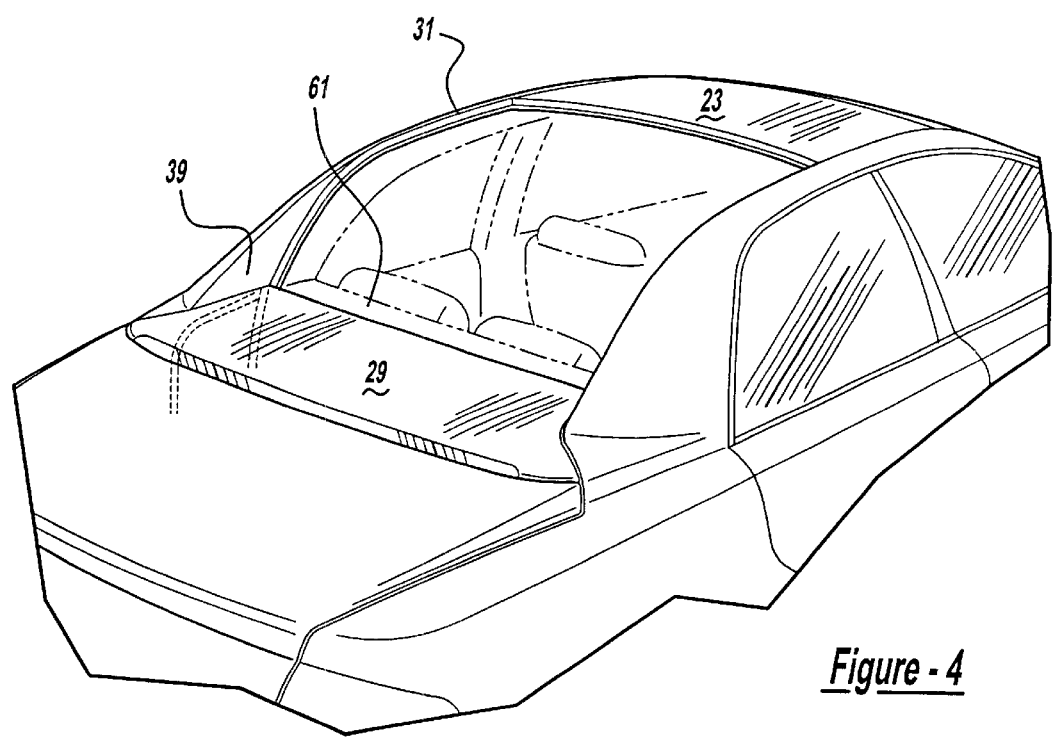
FIG. 4 is a fragmentary perspective view showing the preferred embodiment roof system like FIG. 1, but with the rear roof panel and back window disposed in their respective open and stowed positions.
Figure 5:
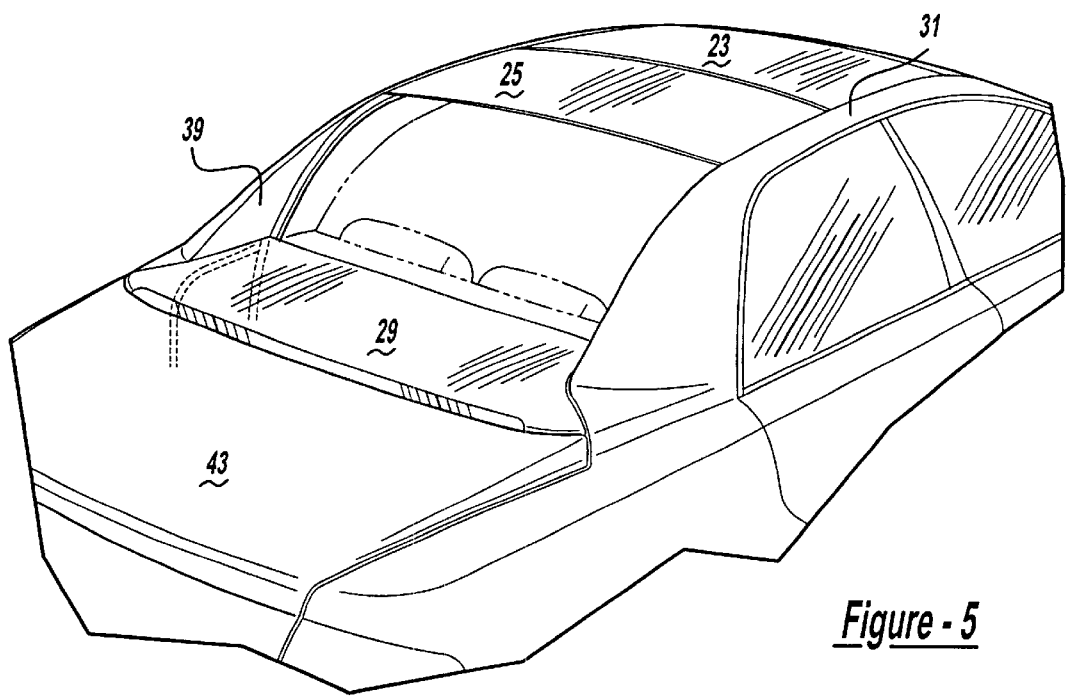
FIG. 5 is a fragmentary perspective view showing the preferred embodiment roof system like FIG. 1, but with the back window disposed in its open and stowed position.
Figure 6:
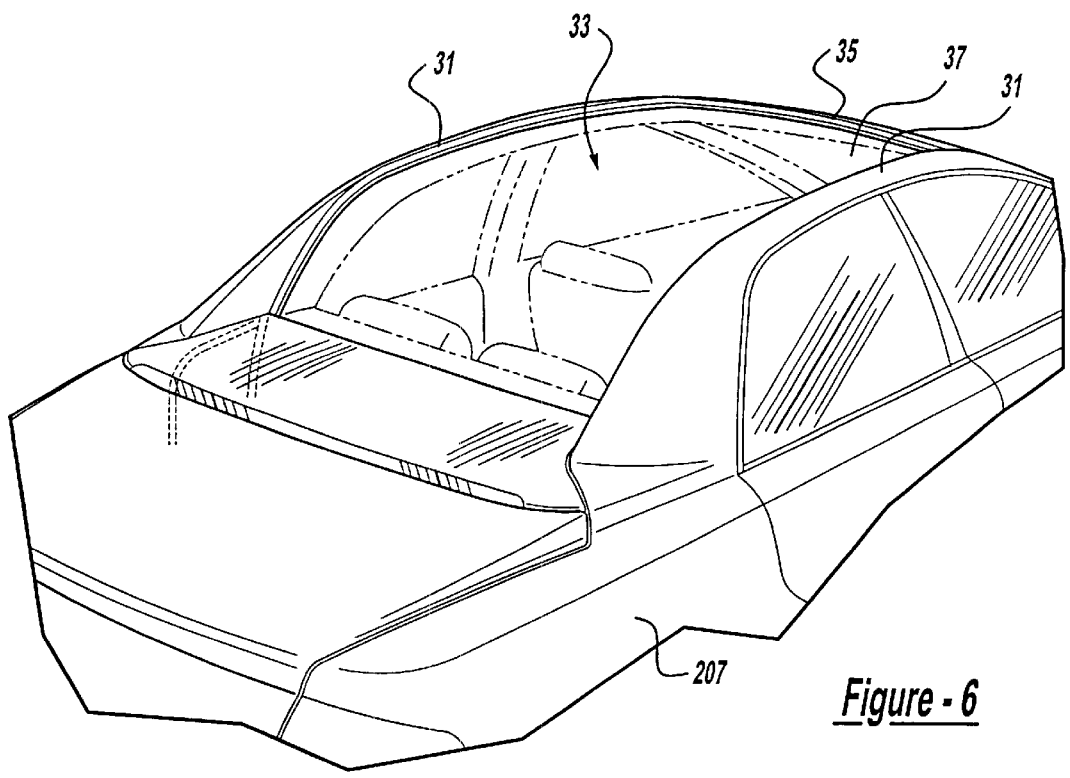
FIG. 6 is a fragmentary perspective view showing the preferred embodiment roof system like FIG. 1, but with the front roof panel, rear roof panel and back window all retracted to their open and stowed positions below the tonneau cover.

A rear roof slider 301 also has laterally extending feet attached to the same channel of track 271. Another electric motor 303 is coupled to slider 301 by a sunroof-type cable 305. Slider 301 is pivotably coupled to each corner of rear roof panel 25 without the need for additional linkages or cams to allow for simple linear sliding of rear roof panel from its closed position, as shown in FIG. 5, to an open and stowed position within roof storage compartment 209, as shown in FIGS. 4, 5 and 17 with the panel remaining in its vented position.

Figure 18:
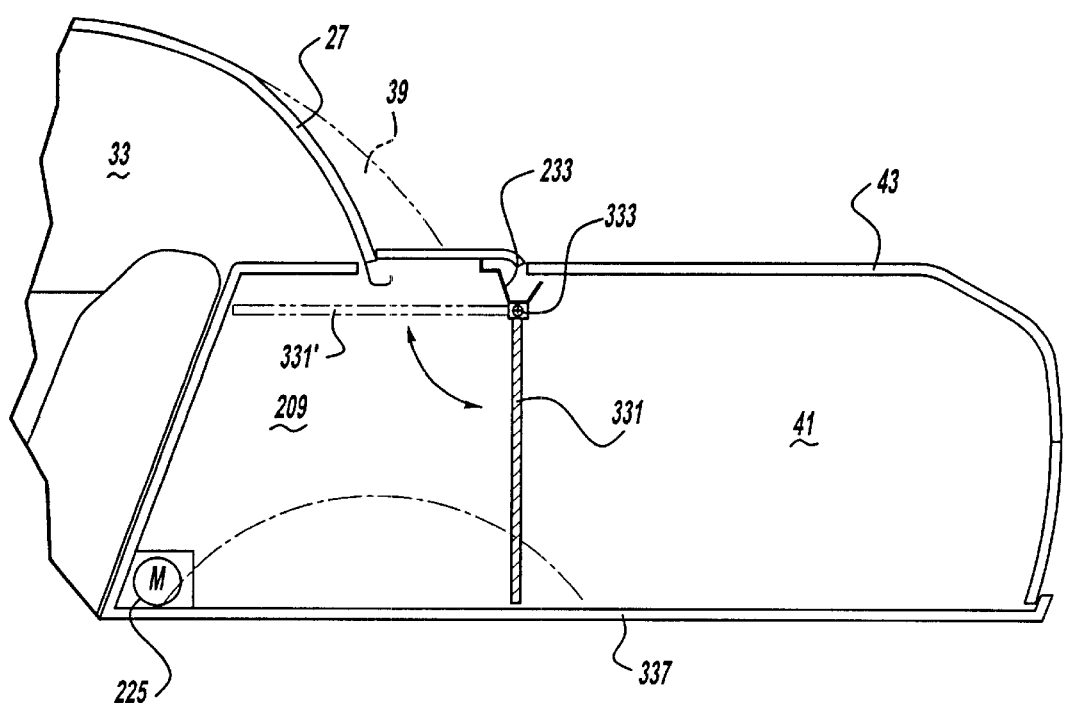
FIG. 18 is a diagrammatic side view showing the preferred embodiment roof system employing a dividing panel between a roof storage compartment and a trunk compartment.

A dividing panel can be observed in FIG. 18. Dividing panel 331 is pivotable about a bracket 333 fastened to a bottom side of rear reinforcement 233. An electric motor 335 or other actuator is mechanically coupled to dividing panel 331 by way of a cable, linkage arrangement or other mechanism to pivot dividing panel 331 between a generally vertical closed position and a generally horizontal raised position 331'. Alternately, dividing panel 331 can be pivoted about a bottom edge adjacent to a trunk floor pan 337. Dividing panel 331 serves to separate trunk compartment 41 from roof storage compartment 209 when in the vertical functional position. This also serves to protect the stowed back window 27 from damage from objects and trunk compartment 41. Dividing panel 331 is moved to its non-functional horizontal position 331' when all of the roof panels and the back window are in their closed and raised positions. This allows for free accessibility and communication between trunk compartment 41 and roof storage compartment 209 thereby significantly increasing the available luggage space. It may be desirable to include a storage compartment obstruction sensor of the type disclosed in U.S. Pat. No. 5,864,214 entitled "Storage Compartment Sensor System for Use with an Automotive Vehicle" which issued to Brodsky on Jan. 29, 1999, which is incorporated by reference herein. Dividing panel 331 is preferably a rigid plastic or pressboard member that may alternately be made of a flexible material which is collapsible or can be automatically rolled about a motor driven, spring biased roller for stowage.

While the preferred embodiment of the movable roof system for an automotive vehicle has been disclosed herein, it should be appreciated that other embodiments may be employed without departing from the present invention. For example, the preferred body colored, metal roof panels may be replaced by generally transparent glass roof panels. Also, the rear roof panel can be supplied with a tilting mechanism like that employed for the front roof panel to allow for independent venting. The front and rear roof panels may also have their sliding mechanisms engaged within adjacent but separate track channels to allow for even more independent movement between the front and rear roof panels. Additionally, the back window can be secured to the rear roof panel for simultaneous movement therewith rather than the preferred embodiment of allowing independent retraction of the back window separate from the rear roof panel 25. Moreover, it is alternately envisioned that scissor driving mechanisms and other camming and linkage arrangements can be employed to tilt or slide the front roof panel, rear roof panel or back window relative to the stationarily fixed tracks. Various of the electric motors may also be combined functionally together or replaced for by hydraulic or other actuating devices. Another alternate variation excludes the center high mount stop light from the tonneau cover and instead places it on the deck lid. A further alternate construction uses the deck lid or package shelf as a tonneau cover substitute as long as the desired functions are achieved. While various materials have been disclosed, other materials can be readily used. It is intended by the following claims to cover these and any other departures from the disclosed embodiments which fall within the true spirit of this invention.

The invention claimed is:

1. An automotive vehicle roof system comprising:
   a pair of stationary side rails;
   a first substantially rigid roof panel movably coupled to the rails;
   a substantially rigid back window movably coupled to the rails;
   a storage compartment positioned adjacent to an end of each of the rails and below a vehicle belt-line, the roof panel being slidable from a closed to an open position located in the storage compartment, the back window being movable from a closed position to an open position located in the storage compartment;
   the roof panel being movable to an intermediate position which is partially open and located outside of the storage compartment; and
   a covering panel automatically movable from a closed position covering the storage compartment to an open position, the open position of the covering panel operably allowing passage of the roof panel and the back window into the storage compartment; and
   wherein the roof panel is automatically movable from its closed position to its open position while the automotive vehicle is being driven.

2. The system of claim 1 wherein the covering panel is substantially rigid.

3. The system of claim 2 further comprising a trunk lid movable from a closed position to an open position when the covering panel is located in its closed position.

4. The system of claim 1 further comprising a second movable roof panel coupled to the rails, the second roof panel being movable from a closed position disposed between the first roof panel and the back window, to an open position within the storage compartment.

5. The system of claim 4 wherein the first roof panel is movable to its intermediate position while the second roof panel and the back window remain in their closed positions.

6. The system of claim 1 wherein the intermediate position of the first roof panel is a tilted venting position.

7. The system of claim 1 wherein the back window is operably moved from its closed position to its open position while the first roof panel remains stationary.

8. The system of claim 1 further comprising:
   an elongated track mounted to each side rail; and
   camming mechanisms coupling the first roof panel to the tracks.

9. The system of claim 8 further comprising:
   an electromagnetic device; and
   an elongated and flexible cable coupled to the track, the cable operably driving one of the camming mechanisms and the first sunroof panel when the electromagnetic device is energized.

10. An automotive vehicle roof system comprising:
    a roof movable from a raised position, to an intermediate position and to a stowed position, the intermediate position being located between the raised and stowed position, the vehicle being driven when the roof is in any of the raised, intermediate and stowed positions;
    a substantially rigid tonneau cover movable from a closed position, operably covering the stowed roof, to an open position allowing passage of the roof while the vehicle is being driven;
    a light mounted to the tonneau cover, the light being movable with the tonneau cover;
    a drain trough coupled to the tonneau cover; and
    a rear deck lid movable from an open position to a closed position, the deck lid being located rearward of the tonneau cover when the tonneau cover is in its closed position.

11. The system of claim 10 further comprising:
    an automatic actuator; and
    a linkage assembly coupling the drain trough to the actuator and to the tonneau cover, the drain trough being located adjacent a rear edge of the tonneau cover wherein the light is a brake light.

12. The system of claim 10 wherein the light is mounted to a rear edge of the tonneau cover, the light is elongated in a crosscar direction and coincides with at least a majority of the rear edge of the tonneau cover.

13. The system of claim 10 further comprising a tonneau cover drive mechanism operable to move the tonneau cover from its closed position to its open position while preventing either of the front and back edges of the tonneau cover from pivoting more than 45 degrees above a plane defined by the closed position of the tonneau cover, the tonneau cover being located substantially parallel to the rear deck lid and in a substantially overlapping manner when the tonneau cover is in its open position.

14. An automotive vehicle roof system comprising:
    a retractable vehicle roof;
    a storage compartment located rearward of the roof;
    a back window movable from a closed position, between the roof and the storage compartment, to an open position in the storage compartment, while the roof remains stationary;

a cover panel automatically movable from an open position, to allow access of the window into the storage compartment, to a closed position covering the window when the window is located in the storage compartment, the cover panel being located in a substantially horizontal position above the storage compartment when in its closed position;

a pair of tracks upwardly extending from the storage compartment; and coupling mechanisms connecting upper corners of the back window to the tracks, wherein the back window is automatically movable from its closed position to its open position by being slid along the tracks.

15. The system of claim 14 further comprising:

an electromagnetic device; and an elongated cable operably driven by the electromagnetic device, the cable being attached to at least one of the coupling mechanisms for moving the back window in response to energization of the electromagnetic device.

16. The system of claim 15 further comprising:

each of the pair of tracks having a substantially horizontal section and a substantially vertical section located rearward of the horizontal section; and a second set of coupling mechanisms coupling bottom corners of the back window to the tracks, the back window being movable from a substantially vertical closed position, to a substantially horizontal position and then to a substantially vertical open position.

17. The system of claim 14 further comprising:

a second set of tracks at least partially located in the storage compartment; and coupling mechanisms connecting the roof to the second tracks.

18. An automotive vehicle roof system comprising:

a pair of stationary side rails;

a first substantially rigid roof movably coupled to the rails;

a substantially rigid back window movably coupled to the rails;

a storage compartment positioned adjacent to an end of each of the rails, the roof being slidable from a closed and functional position to an open position located in the storage compartment, the back window being movable from a closed and functional position to an open position located in the storage compartment;

a covering panel movable from a closed position covering the storage compartment to an open position operable to allow access of the roof panel and the back window into the storage compartment; and at least a second movable roof panel slidable from a closed position located between the first roof panel and the back window, to an open position located in the storage compartment wherein the first roof panel is movable to a tilted venting position; and wherein the back window can be moved from its closed position to its open position while the first roof panel remains stationary.

19. The system of claim 18 wherein the first roof panel is rearwardly slidable from its venting position to a spoiler position overlapping above the second roof panel when the second roof panel is substantially located in its closed position.

20. The system of claim 18 wherein the rear roof panel and the back window are movable to their open positions in the storage compartment without requiring movement of the front roof panel.

21. An automotive vehicle roof system comprising:

a pair of stationary side rails;

a first substantially rigid roof movably coupled to the rails;

a substantially rigid back window movably coupled to the rails;

a storage compartment positioned adjacent to an end of each of the rails, the roof being slidable from a closed and functional position to an open position located in the storage compartment, the back window being movable from a closed and functional position to an open position located in the storage compartment;

a covering panel movable from a closed position covering the storage compartment to an open position operable to allow access of the roof panel and the back window into the storage compartment;

at least a second movable roof panel slidable from a closed position located between the first roof panel and the back window, to an open position located in the storage compartment;

a trunk being located behind the storage compartment area, wherein at least about half of the trunk space remains unobstructed when the first roof panel, second roof panel and back window are all stowed in the storage compartment area.

22. An automotive vehicle comprising:

a passenger compartment;

a roof storage compartment located rearward of the passenger compartment;

a tonneau cover movable from an open position allowing access to the roof storage compartment, to a closed position substantially covering the roof storage compartment;

a trunk compartment located rearward of the roof storage compartment;

a trunk lid movable from an open position, allowing access to the trunk compartment, to a closed position, substantially covering the trunk compartment;

a convertible roof movable from a closed position, located above the passenger compartment, to an open position, located in the roof storage compartment; and a dividing member movable to a first position allowing access between the trunk compartment and the roof storage compartment when the convertible roof is in its closed position, the dividing member being alternately movable to a substantially vertical second position substantially separating the roof storage compartment from the trunk compartment, when the convertible roof is located in its open position.

23. The automotive vehicle of claim 22 further comprising a pivot mechanism allowing the dividing member to move between its first position and the substantially vertical position.

24. The automotive vehicle of claim 22 wherein the dividing member is a substantially rigid panel and wherein the first position is a substantially horizontal position.

25. The automotive vehicle of claim 22 wherein the convertible roof includes:

a rigid back window and a substantially rigid front roof panel;

wherein the window is located between the front roof panel and the dividing member when the convertible roof is in its open position.

26. An automotive vehicle apparatus comprising:
   a storage compartment cover movable from an open position to a substantially horizontal closed position;
   a back window movable from a raised visible position to a lowered stowed position below the cover;
   a drain trough affixed and movable to the back window adjacent to a bottom peripheral edge of the back window, the drain trough being located below an adjacent edge of the cover when the window is in its raised position and the cover is in its closed position; and
   a seal mounted adjacent the front edge of the cover and flexibly contacting against an exterior surface of the window when the window is in its raised position and the cover is in its closed position.

27. The apparatus of claim 26 further comprising a roof panel movable from a passenger compartment covering position to a stowed position below the storage compartment cover, wherein the storage compartment cover is a tonneau cover.

28. The apparatus of claim 27 wherein the back window is movable from its raised position to its lowered position while the movable roof panel remains stationary.

29. The apparatus of claim 27 wherein the roof panel is substantially rigid and the storage compartment cover is substantially rigid.

30. The apparatus of claim 26 further comprising:
   an electric motor;
   a cable operably driven by the electric motor, the cable being coupled to the back window; and
   an elongated track coupled to the back window, whereby energization of the electric motor causes the cable to move relative to the track.

31. The apparatus of claim 30 further comprising:
   a second track coupled to the storage compartment cover;
   a linkage mechanism coupled to the storage compartment cover; and
   an electric motor operably driving the linkage mechanism to move the cover relative to the track and the back window.

32. The apparatus of claim 26 further comprising:
   a package shelf located adjacent an interior surface of the back window; and
   a second seal mounted adjacent to a rear edge of the package shelf, the second seal including an elongated flexible and elongated finger operable to contact against the interior surface of the back window when the back window is in its raised position.

33. A roof system for use in an automotive vehicle having a passenger compartment and a rear deck lid, the system comprising:
   a pair of elongated tracks stationary mounted substantially above the passenger compartment;
   a first substantially rigid roof panel movably coupled to the tracks; and
   an electromagnetic device coupled to the first roof panel, the electromagnetic device being operable to drive the roof panel from a closed position above the passenger compartment to a stowed position below a substantially horizontal plane defined by the rear deck lid when the lid is closed, a majority of the first roof panel having a substantially vertical orientation when in its stowed position.

34. The system of claim 33 further comprising a second substantially rigid roof panel with trailing and leading drain troughs movably coupled to the tracks, the second roof panel being slidable from a closed position above the passenger compartment to a stowed position below the plane.

35. The system of claim 34 further comprising a rigid back window movable from a raised position to a stowed position even when the first and second roof panels remain in their closed positions.

36. The system of claim 33 further comprising a substantially rigid tonneau cover movable from an open position to a closed position, the tonneau cover substantially hiding the back window when the back window is in its stowed position and the tonneau cover is in its closed position.

37. The system of claim 36 further comprising:
   a second electric motor coupled to the back window, the second electric motor being operable to drive the back window from its raised position to its stowed position; and
   a third electric motor coupled to the tonneau cover, the third electric motor operably driving the tonneau cover from its closed position to its opened position.

38. The system of claim 33 further comprising:
   a tilting mechanism coupling the first roof panel to one of the tracks;
   an elongated and substantially flexible member located adjacent and substantially parallel to the one track; and
   an actuator energizable to move the elongated member, energization of the actuator causing the elongated member to drive the tilting mechanism which causes the first roof panel to move from its closed and substantially horizontal position to a venting position, a rear edge of the first roof panel being located above the closed position of the rear edge when the first roof panel is in its venting position.

39. A roof system for use in an automotive vehicle having a passenger compartment and a rear deck lid, the system comprising:
   a pair of elongated tracks stationary mounted substantially above the passenger compartment;
   a first substantially rigid roof panel movably coupled to the tracks;
   an electromagnetic device coupled to the first roof panel, the electromagnetic device being operable to drive the roof panel from a closed position above the passenger compartment to a stowed position below a substantially horizontal plane defined by the rear deck lid when the lid is closed;
   a tilting mechanism coupling the first roof panel to one of the tracks; and
   an actuator coupled to the tilting mechanism, energization of the actuator driving the tilting mechanism which causes the first roof panel to move from its closed and substantially horizontal position to a venting position;
   wherein the tilting mechanism is oriented to cause the first roof panel to remain in its venting position relative to the tracks even when stowed.

* * * * *